May 3, 1938.　　　　L. WETHERILL　　　　2,116,419
HIGH VOLTAGE BUSHING
Filed March 23, 1937
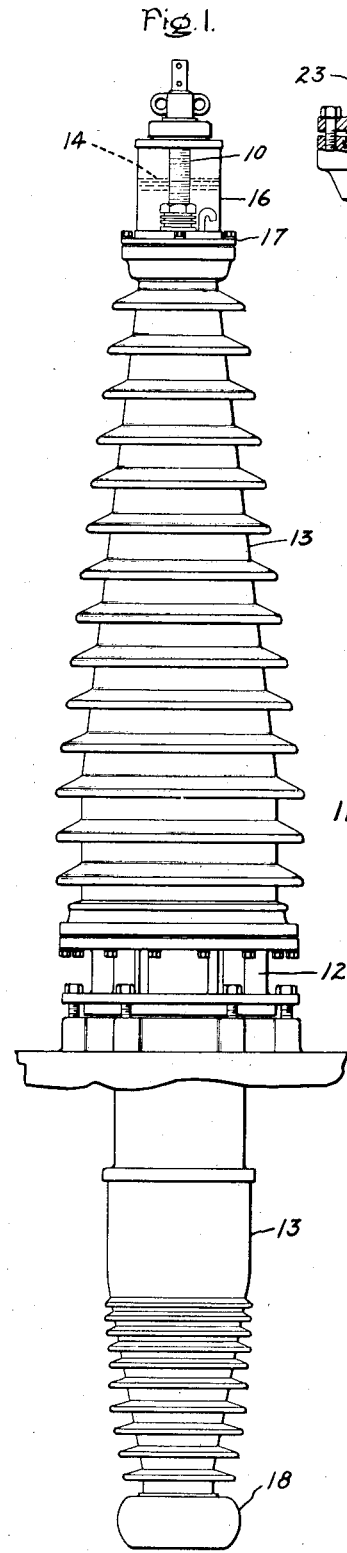
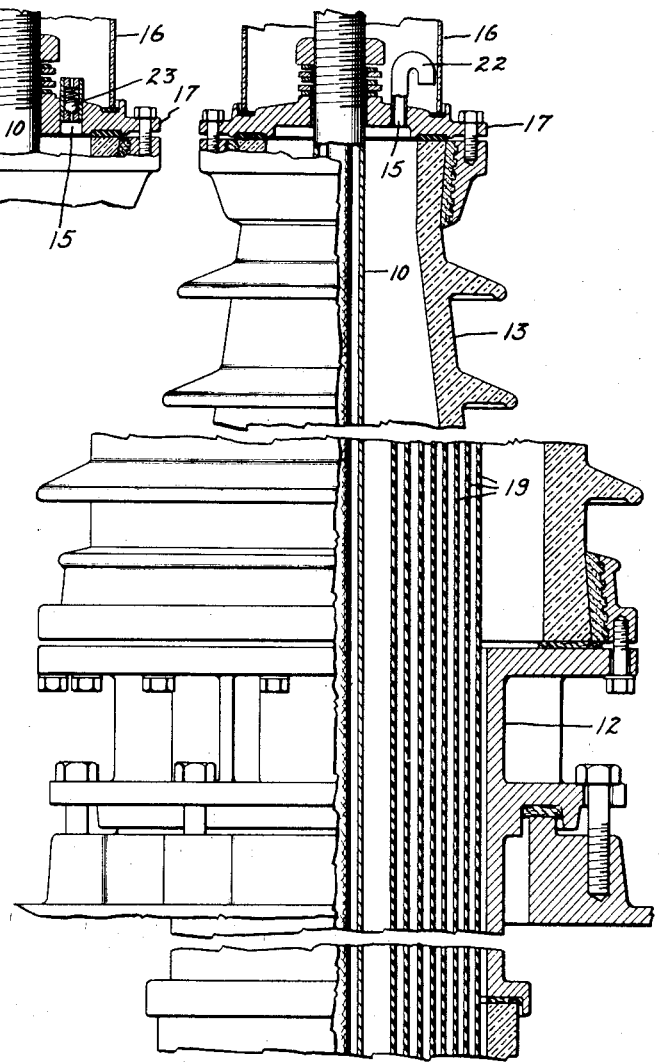
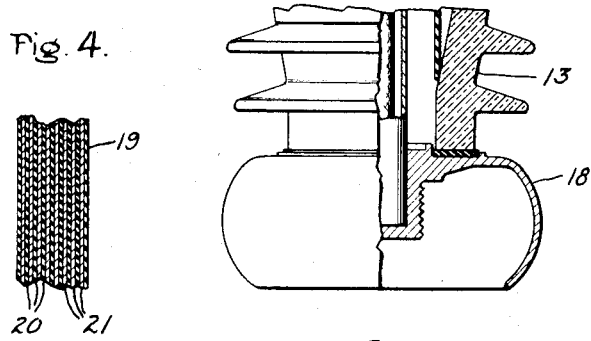
Inventor:
Lynn Wetherill,
by Harry E. Dunham
His Attorney.

Patented May 3, 1938

2,116,419

UNITED STATES PATENT OFFICE 2,116,419

HIGH VOLTAGE BUSHING

Lynn Wetherill, Pittsfield, Mass., assignor to General Electric Company, a corporation of New York Application March 23, 1937, Serial No. 132,543

7 Claims. (Cl. 173—318)

My invention relates to high voltage bushings of the liquid-filled type. The usual bushing of this type includes a conductor surrounded by a casing filled with an insulating liquid and provided at its upper end with an expansion chamber to permit free thermal expansion and contraction of the liquid. The casing includes a central metal portion and two end portions formed of a suitable insulating material such as porcelain so that the terminals of the bushing are effectively insulated from the metal portion. A plurality of spaced insulating cylinders usually surround the conductor to provide the necessary amount of insulation between it and the metal portion of the casing. The casing is tightly sealed except for an opening into the expansion chamber where the insulating liquid is exposed to air. Whenever the temperature of the liquid increases, it expands and some of it is forced into the expansion chamber so that some air is forced out of the expansion chamber. Whenever the temperature of the liquid decreases, it contracts and some of the liquid in the expansion chamber is drawn back into the casing so that some outside air is drawn into the expansion chamber. This outside air of course usually contains some moisture. If this moisture condenses it will settle to the bottom of the expansion chamber where it will do no harm but some of it may be absorbed by the liquid and be drawn into the casing when the temperature of the liquid decreases and the liquid contracts. A very small amount of moisture in the liquid is sufficient to lower its dielectric strength considerably but the amount of moisture introduced in the casing as a result of expansion and contraction of the liquid is not particularly serious. I have conducted extensive tests which have shown that a considerably greater amount of moisture may reach the liquid within the casing by reason of thermal circulation which takes place continuously by convection so long as the bushing is heated by a current in its conductor or by any electrical apparatus with which the bushing is associated. These tests have also shown that a small amount of moisture reaching the liquid within the casing may affect the power factor of the bushing long before it has any appreciable effect on its dielectric strength. Measurements of the power factor rather than of the dielectric strength of the bushing are therefore most reliable as indicating a change in the condition of the bushing which may lead ultimately to its failure.

When it is desired to measure power factor of apparatus connected to bushings for the purpose of detecting an abnormal increase of its power factor, the maintenance of the initially low power factor of the bushings is highly important since it permits high power factor of the connected apparatus to be detected without the necessity of disconnecting the bushings from the apparatus.

The general object of the invention is to provide an improved liquid filled bushing with means for effectively preventing substantial increase in power factor of the bushing.

The invention will be more clearly understood from the following description taken in connection with the accompanying drawing in which Fig. 1 is a side view of a liquid-filled bushing constructed in accordance with the invention; Fig. 2 is a similar view on an enlarged scale, parts being broken away and parts being shown in section; Fig. 3 is a detailed view of a modification; and Fig. 4 shows an explanatory detail view.

Like reference characters indicate similar parts in the different figures of the drawing.

The bushing shown in the drawing includes an axial conductor 10 surrounded by a casing 11 which includes a central metal portion 12 and and two insulating end portions 13. The casing is filled with an insulating liquid 14 which extends through an opening 15 into an expansion chamber 16 mounted on an end cap 17 which closes the upper end of the bushing. Another end cap 18 closes the lower end of the bushing. A plurality of spaced insulating cylinders 19 are arranged concentrically between the conductor 10 and the casing 11.

The insulating cylinders 19 are formed of layers of paper 20 impregnated with a suitable, hardened insulating compound 21 as indicated in the magnified view in Fig. 4 of a small cross-section of one of the cylinders. If a small amount of moisture reaches the liquid 14 within the casing 11 my tests have shown that much or even all of this moisture will be absorbed by the absorbent layers of paper in the insulating cylinders 19 so that the dielectric strength of the bushing may not be appreciably affected. The moisture in the insulating cylinders 19, however, may affect the power factor of the bushing very considerably because the moisture in the layers of paper increases their conductivity and these partially conductive layers extend not only between the conductor 10 and the metal portion 12 of the bushing but considerably beyond this metal portion 12 toward each end of the bushing. I have found further by my tests that if the opening 15 is so arranged that no thermal convection circulation of liquid can take place through it, then the transfer of moisture from the expansion chamber 16 to the insulating cylinders 19 is prevented or at least very much retarded and the bushing will retain its initial low power factor as well as its initial high dielectric strength for a much longer period of time.

One arrangement for providing communication between the expansion chamber 16 and the casing 13 and which will effectively prevent thermal circulation of the liquid is shown in Fig. 2 as a small tube 22 extending through the end cap 17 and formed with an inverted U-shaped end projecting into the expansion chamber 16. The open end of this tube 22 in the expansion chamber 16 should of course be spaced sufficiently above the bottom of the expansion chamber to permit accumulation of condensed moisture without danger of its being drawn through the tube into the casing. If the insulating liquid 14 in the casing 11 is heated to a temperature above that of the liquid in the expansion chamber 16, the heated liquid may perhaps rise by convection as far as the uppermost portion of the tube 22 where it will be stopped and no thermal convection circulation of the liquid through this tube 22 can take place.

While I prefer the form of thermal convection stop shown in Fig. 2, other arrangements are of course possible. For example, in Fig. 3 communication between the casing 13 and the expansion chamber 16 is provided by two openings 15, each provided with a check valve 23. The two check valves 23 close the openings 15 in opposite directions so that expansion of the liquid due to increased temperature may force some of the liquid through one of the valves 23 into the expansion chamber 16 and contraction of the liquid may draw some of the liquid back from the expansion chamber 16 into the bushing.

The invention has been explained by describing and illustrating different forms thereof but it will be apparent that further changes may be made without departing from the spirit of the invention and the scope of the appended claims.

What I claim as new and desire to secure by Letters Patent of the United States, is,—

1. A high voltage bushing including a conductor, a casing surrounding said conductor, an expansion chamber communicating with said casing, insulating liquid filling the casing and extending into the expansion chamber, and a thermal convection stop for preventing thermal circulation by convection of the liquid between the casing and expansion chamber but constructed to permit circulation of the liquid due to thermal expansion and contraction.

2. A high voltage bushing including a conductor, a casing surrounding said conductor, an expansion chamber, insulating liquid filling the casing and extending into the expansion chamber, and a U-shaped tube connecting said casing and expansion chamber to permit interchange of liquid without thermal convection circulation therebetween.

3. A high voltage bushing including a conductor, a casing surrounding said conductor, an expansion chamber, a tube connecting said casing and expansion chamber, and an insulating liquid filling the casing and extending through said tube into the expansion chamber, said tube having an inverted U-shaped end portion within the expansion chamber to prevent thermal convection circulation of the liquid through the tube.

4. A high voltage bushing including a conductor, a casing having an end cap and surrounding said conductor, an expansion chamber mounted directly on said end cap and communicating with said casing through an opening in said end cap, an insulating liquid filling said casing and extending into said expansion chamber, and a thermal convection stop for preventing thermal circulation of the liquid by convection between said casing and said expansion chamber through said opening.

5. A high voltage bushing including a conductor, a casing having an end cap and surrounding said conductor, an expansion chamber mounted directly on said end cap and communicating with said casing through an opening in said end cap, an insulating liquid filling said casing and extending into said expansion chamber, and a thermal convection stop for preventing thermal circulation of the liquid by convection between said casing and said expansion chamber through said opening, said thermal convection stop communicating with said expansion chamber above the level of accumulation of condensed moisture within the expansion chamber.

6. A high voltage bushing including a conductor, a casing surrounding said conductor, an expansion chamber, and an insulating liquid filling the casing and extending through said tube into the expansion chamber, said tube having an inverted U-shaped end portion within the expansion chamber to prevent thermal convection circulation of the liquid through the tube, and the open end of the U-shaped portion of the tube being spaced above the level of accumulation of condensed moisture within the expansion chamber.

7. A high voltage bushing including a conductor, a casing surrounding said conductor, an expansion chamber, there being two openings between the casing and expansion chamber, an insulating liquid filling the casing and extending through said openings into the expansion chamber, and a check valve in each opening to prevent thermal convection circulation of the liquid through the openings, said check valves being directed in opposite directions to permit interchange of liquid between the casing and expansion chamber in response to expansion and contraction of the liquid in the casing.

LYNN WETHERILL.